(12) United States Patent
Wu et al.

(10) Patent No.: US 12,338,334 B2
(45) Date of Patent: Jun. 24, 2025

(54) IMPREGNATION DEVICE FOR FIBER PREPREG AND METHOD THEREOF

(71) Applicant: FORMOSA PLASTICS CORPORATION, Kaohsiung (TW)

(72) Inventors: Han-Chang Wu, Kaohsiung (TW); Chih-Hsuan Ou, Kaohsiung (TW); Chieh-Shun Yang, Kaohsiung (TW); Long-Tyan Hwang, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 163 days.

(21) Appl. No.: 17/901,217

(22) Filed: Sep. 1, 2022

(65) Prior Publication Data

US 2023/0069437 A1 Mar. 2, 2023

(30) Foreign Application Priority Data

Sep. 1, 2021 (TW) .................................. 110132416

(51) Int. Cl.
*C08J 5/24* (2006.01)
*B29B 15/10* (2006.01)
(Continued)

(52) U.S. Cl.
CPC ............... *C08J 5/243* (2021.05); *B29B 15/10* (2013.01); *C08J 5/244* (2021.05); *B29K 2063/00* (2013.01); *B29K 2307/04* (2013.01); *B29K 2309/08* (2013.01); *B29K 2995/0098* (2013.01); *C08J 2363/00* (2013.01)

(58) Field of Classification Search
CPC ..... C08J 5/24; C08J 5/241; C08J 5/242; C08J 5/243; C08J 5/244; C08J 5/245; C08J 5/246; C08J 5/247; C08J 5/248; C08J 5/249; B29B 11/00; B29B 11/02; B29B 11/04; B29B 11/06; B29B 11/12;
(Continued)

(56) References Cited

U.S. PATENT DOCUMENTS 3,755,061 A 8/1973 Schurb
8,807,186 B1 * 8/2014 Lee ......................... B32B 37/06
156/499

(Continued)

FOREIGN PATENT DOCUMENTS

CN 104891254 A 9/2015
CN 109849219 A 6/2019
(Continued)

OTHER PUBLICATIONS

Takahashi (JP2014055136) Machine Translation (Year: 2014).*
Chen (TWM465662U) Machine Translation (Year: 2013).*

*Primary Examiner* — Andrew L Swanson
(74) *Attorney, Agent, or Firm* — MUNCY, GEISSLER, OLDS & LOWE, P.C.

(57) ABSTRACT

The present disclosure provides an impregnation device for a fiber prepreg, which includes a film layer separation assembly, a hot pressing element, and a thermal barrier element. The hot pressing element is disposed beneath the film layer separation assembly. The thermal barrier element is disposed between the film layer separation assembly and the hot pressing element. The present disclosure also provides an impregnation method for a fiber prepreg.

5 Claims, 4 Drawing Sheets

(51) Int. Cl.
*B29K 63/00* (2006.01)
*B29K 307/04* (2006.01)
*B29K 309/08* (2006.01)

(58) Field of Classification Search
CPC .. B29B 15/12; B29D 7/01; B30B 3/00; B30B 3/04; B30B 15/34
See application file for complete search history.

(56) References Cited

U.S. PATENT DOCUMENTS

| | | | |
|---|---|---|---|
| 10,737,411 B1 | 8/2020 | Hundley et al. | |
| 2002/0129886 A1* | 9/2002 | Kerr | B32B 37/0053 156/60 |
| 2004/0040669 A1* | 3/2004 | Lin | B32B 37/0053 156/583.1 |
| 2011/0129737 A1 | 6/2011 | Lee et al. | |
| 2014/0070449 A1* | 3/2014 | Van De Hee | B29C 55/06 264/175 |
| 2014/0338824 A1* | 11/2014 | Takagi | B29D 99/005 156/237 |
| 2018/0345540 A1 | 12/2018 | Tosaka et al. | |
| 2019/0284731 A1 | 9/2019 | Oberste et al. | |
| 2020/0376715 A1* | 12/2020 | Sasaki | B29C 70/504 |

FOREIGN PATENT DOCUMENTS

| | | | | |
|---|---|---|---|---|
| GB | 2572110 A | | 9/2019 | |
| JP | 2012167260 A | | 9/2012 | |
| JP | 2014055136 A | * | 3/2014 | ........... C07D 487/04 |
| JP | 2014058136 A | * | 4/2014 | |
| JP | 2019523834 A | | 8/2019 | |
| JP | 2019199488 A | | 11/2019 | |
| JP | 2023-33240 A | | 3/2023 | |
| KR | 20120093701 A | | 8/2012 | |
| KR | 10-2018-0096347 A | | 8/2018 | |
| TW | 592005 B | | 6/2004 | |
| TW | M465662 U | * | 11/2013 | ............. H01L 21/67 |
| WO | WO2016/178399 A1 | | 11/2016 | |

* cited by examiner

IMPREGNATION DEVICE FOR FIBER PREPREG AND METHOD THEREOF

CROSS-REFERENCE TO RELATED APPLICATION

This application claims priority to Taiwan Application Serial Number 110132416, filed Sep. 1, 2021, which is herein incorporated by reference.

BACKGROUND

Field of Invention

The present disclosure relates to an impregnation device for a fiber prepreg and an impregnation method thereof.

Description of Related Art

Fabrication of a fiber prepreg has two stages. First, a resin coating stage is performed, that is, a resin is coated on a release layer. Next, an impregnation stage is performed, mainly by hot pressing a resin layer and a fiber layer (yarn spread treatment can be performed before hot pressing) to form the fiber prepreg. Fabrics made from the fiber prepreg are widely used in a wide range of applications. For example, a reinforced composite material made from a carbon fiber prepreg composed of carbon fibers and a resin is lightweight and has excellent strength and modulus, so that it is widely used in structural parts of sports and entertainment products, structures and interior parts of transportation vehicles, or civil construction.

However, in a conventional impregnation device, in order to facilitate continuous execution of operations, a resin layer sending element and a separation element for separating a resin layer and a film layer are adjacent to a hot pressing element (e.g., disposed over the hot pressing element). When the hot pressing element is heated, generated heat radiation and hot air will cause the resin layer located on the sending element and the separation element to soften too early, so that when the film layer is subsequently separated, the resin sticks to the film layer, resulting in poor impregnation.

SUMMARY

Therefore, an aspect of the present disclosure provides an impregnation device for a fiber prepreg, which includes a film layer separation assembly, a hot pressing element disposed beneath the film layer separation assembly in a vertical direction, and a thermal barrier element disposed between the film layer separation assembly and the hot pressing element in the vertical direction.

In some embodiments, the film layer separation assembly includes: a first roller; a film layer receiving element disposed over the first roller; and a second roller disposed between the film layer receiving element and the first roller in the vertical direction, and a separation angle between a direction of the first roller facing the film layer receiving element and a direction of the first roller facing the second roller is greater than 0°.

In some embodiments, a position of the second roller is adjustable, and a separation angle is able to be changed by changing the position of the second roller.

In some embodiments, the impregnation device further includes: a resin film sending element disposed over the first roller, and when projected vertically on a horizontal plane where the first roller is located, the resin film sending element and the film layer receiving element are respectively located at opposite sides of the first roller, in which the horizontal plane where the first roller is located is perpendicular to the vertical direction; and a fiber sending element disposed beneath the film layer separation assembly.

In some embodiments, a surface of the thermal barrier element close to the hot pressing element is made of a heat reflective material.

In some embodiments, the thermal barrier element is arc-shaped.

In some embodiments, when projected vertically on a horizontal plane where the hot pressing element is located, a projection of the thermal barrier element is coincident and larger than a projection of the hot pressing element, in which the horizontal plane where the hot pressing element is located is perpendicular to the vertical direction.

An aspect of the present disclosure provides an impregnation method for a fiber prepreg, which includes: providing an impregnation device including a film layer separation assembly, a hot pressing element disposed beneath the film layer separation assembly in a vertical direction, and a thermal barrier element disposed between the film layer separation assembly and the hot pressing element in the vertical direction; providing a resin film, in which the resin film includes a release film, a resin layer located on the release film, and a film layer located on the resin layer; separating the film layer and the resin layer of the resin film using the film layer separation assembly of the impregnation device to obtain a resin composite structure including the release film and the resin layer; providing a fiber layer; hot pressing the resin composite structure, the fiber layer and the resin composite structure from top to bottom using the hot pressing element of the impregnation device at a temperature higher than 90° C. to obtain a fiber prepreg, in which the resin layer of the fiber prepreg is in direct contact with the fiber layer.

In some embodiments, during using the hot pressing element of the impregnation device, the film layer separation assembly of the impregnation device is used simultaneously to separate the film layer and the resin layer of the resin film.

In some embodiments, separating the film layer and the resin layer of the resin film using the film layer separation assembly of the impregnation device includes: when a tack of the resin layer is in a range of from 500 grams to 2,000 grams, a separation angle of the film layer and the resin layer in the film layer separation assembly is adjusted to be in a range of from 18° to 45°.

BRIEF DESCRIPTION OF THE DRAWINGS

In order to make the above and other objects, features, advantages and embodiments of the present disclosure more clearly understood, the detailed description of the accompanying drawings is as follows.

DETAILED DESCRIPTION

Figure 1:
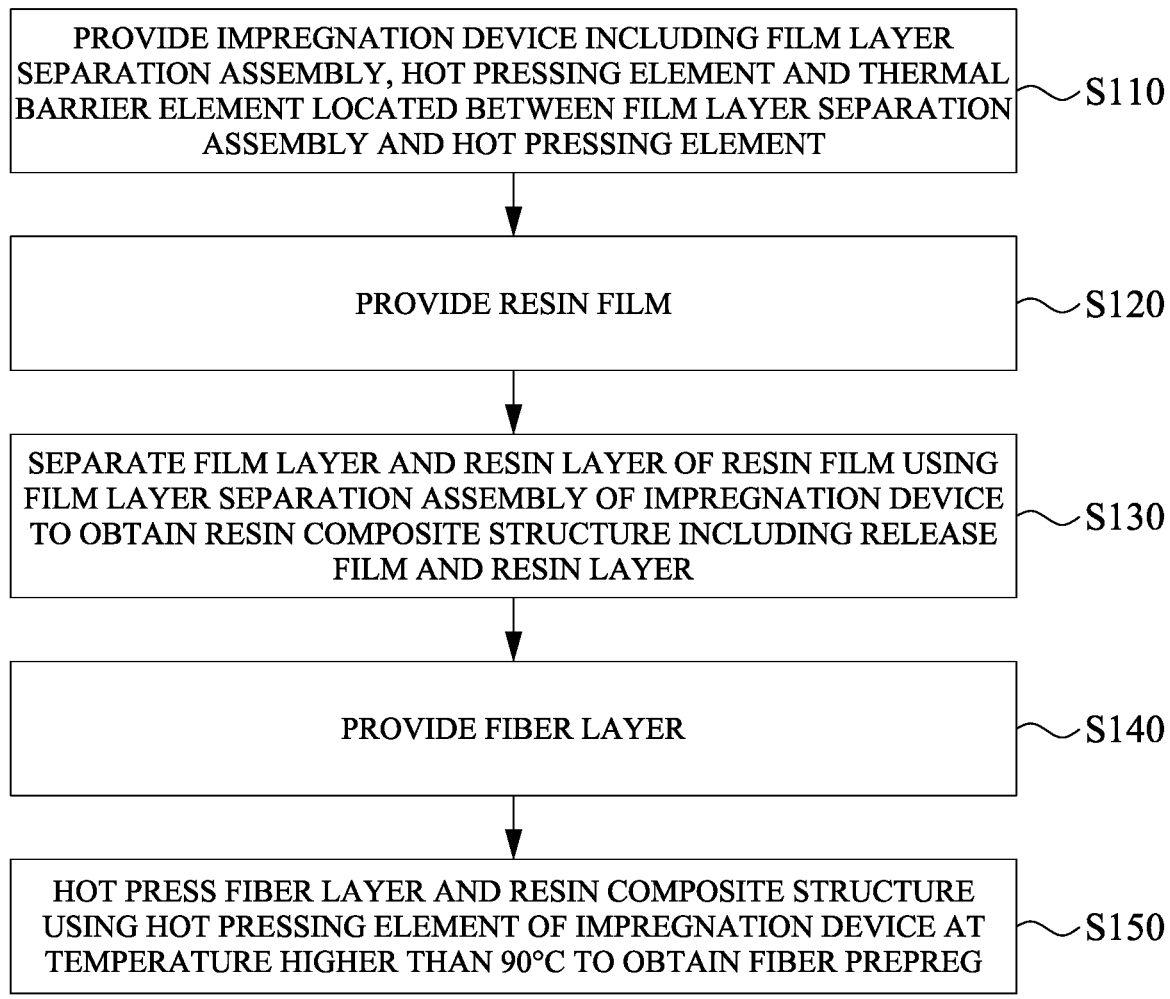
FIG. 1 is a flow chart of an impregnation method for a fiber prepreg according to some embodiments of the present disclosure.

It is to be understood that different implementations or embodiments provided in the following may implement different features of the subject matter of the present disclosure. The embodiments of specific components and arrangements are used to simplify the disclosure and not to limit the disclosure. Of course, these are only examples and are not intended to be limiting. For example, the description below that the first feature is formed on the second feature includes the two being in direct contact, or there are other additional features between the two that are not in direct contact. Furthermore, the present disclosure may repeat reference numerals and/or symbols in the various embodiments. Such repetition is for simplicity and clarity and does not represent a relationship between the various embodiments and/or configurations discussed.

Terms used in this specification generally have their ordinary meanings in the art and in the context in which they are used. The embodiments used in this specification, including examples of any terms discussed herein, are illustrative only and do not limit the scope and meaning of the disclosure or any exemplified terms. Likewise, the present disclosure is not limited to some of the implementations provided in this specification.

In addition, spatially relative terms, such as "beneath", "over", etc., are used to conveniently describe the relative relationship between one element or feature and another element or feature in the drawings. These spatially relative terms are intended to encompass different orientations of the device in use or operation in addition to the orientation shown in the figures. The device may be otherwise oriented (rotated 90° or at other orientations), and the spatially relative description used herein may likewise be interpreted accordingly.

In this article, unless the context of the article is specifically limited, otherwise "a" and "the" can refer to a single one or a plurality of. It will be further understood that the terms "comprising", "including", "having" and similar words used herein designate the recited features, regions, integers, steps, operations, elements and/or components, but do not exclude other features, regions, integers, steps, operations, elements, components, and/or groups thereof.

As used herein, "comprise", "include", "have", and similar terms as used herein indicate described features, regions, integers, steps, operations, elements and/or components, but not exclude other features, regions, integers, steps, operations, elements, components and/or groups.

All documents cited herein by reference are deemed to be specifically and individually incorporated by reference for each individual document or patent application. To the extent that a citation has a definition or usage of a term that is inconsistent with or contrary to the definition of the term herein, the definition of the term herein applies.

Several embodiments are listed below to describe the touch device of the present disclosure in more detail, but it is only for illustration purposes, not for limiting the present disclosure, and the protection scope of the present invention shall be defined by the appended patent application scope whichever shall prevail.

Please refer to FIG. 1. FIG. 1 is a flowchart of an impregnation method 100 for a fiber prepreg according to some embodiments of the present disclosure, which includes step S110, providing an impregnation device including a film layer separation assembly, a hot pressing element and a thermal barrier element located between the film layer separation assembly and the hot pressing element; step S120, providing a resin film; step S130, separating a film layer and a resin layer of the resin film using the film layer separation assembly of the impregnation device to obtain a resin composite structure including a release film and the resin layer; step S140, providing a fiber layer; and step S150, hot pressing the fiber layer and the resin composite structure using the hot pressing element of the impregnation device at a temperature higher than 90° C. to obtain a fiber prepreg.

In some embodiments, the impregnation device may be used only in some steps (e.g., the steps S130 and S150). For example, the resin film and the fiber layer may be provided manually or by other machines, respectively. In some embodiments, all of the steps of the impregnation method 100 shown in FIG. 1 may be performed by only a single impregnation device for the fiber prepreg. For easy understanding, the following takes an impregnation device 200 of FIG. 2 as an example to specifically describe a process of the impregnation method 100 for the fiber prepreg. However, aspects of the present disclosure are not limited thereto.

Figure 2:
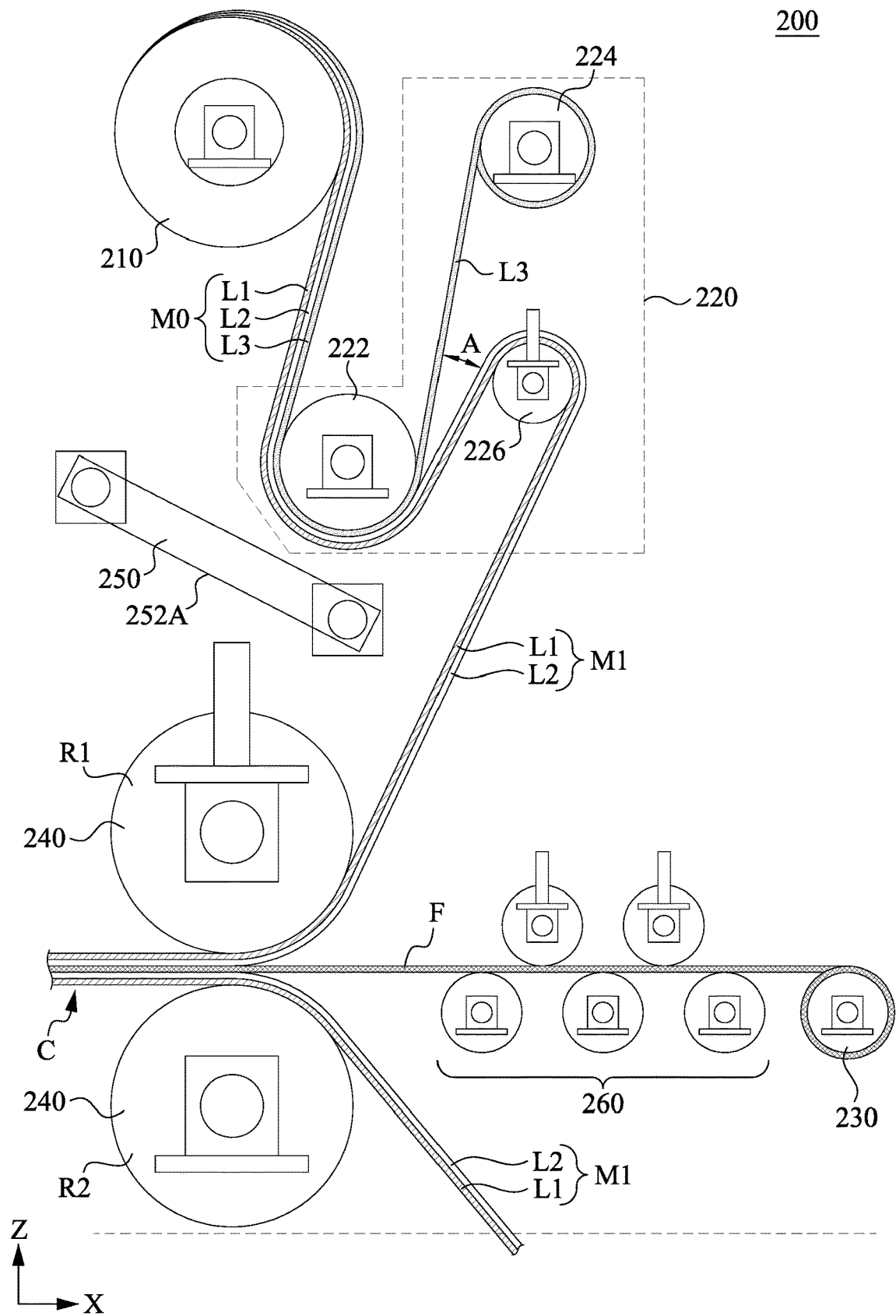
FIG. 2 is a side view illustrating an impregnation device for a fiber prepreg when an impregnation method is performed according to some embodiments of the present disclosure.

FIG. 2 is a side view illustrating an impregnation device 200 for a fiber prepreg when an impregnation method is performed according to some embodiments of the present disclosure.

As shown in FIG. 2, the impregnation device 200 is provided, which includes a resin film sending element 210, a film layer separation assembly 220, a fiber sending element 230, a hot pressing element 240, and a thermal barrier element 250. Unless otherwise specified below, the relative relationship between "up" and "down" between the elements is mainly for the Z-axis direction (vertical direction). The resin film sending element 210 is adjacent to the film layer separation assembly 220, for example, is located over a first roller 222 of the film layer separation assembly 220. When projected vertically on a horizontal plane where the first roller 222 is located (the plane on the X axis that is perpendicular to the Z axis), the resin film sending element 210 and a film layer receiving element 224 are respectively located at opposite sides of the first roller 222. The hot pressing element 240 is disposed beneath the film layer separation assembly 220. The fiber sending element 230 is disposed beneath the film layer separation assembly 220, for example, in the Z-axis direction, is disposed between rollers R1 and R2 of the hot pressing element 240. The thermal barrier element 250 is disposed between the hot pressing element 240 and the film layer separation assembly 220.

First, a resin film M0 is provided via the resin film sending element 210, in which the resin film M0 includes a release film L1, a resin layer L2 on the release film L1, and a film layer L3 on the resin layer L2.

In some embodiments, the film layer L3 is a transparent film structure for blocking the contact of the resin layer L2 with suspended particles in the environment or contaminants from other sources, so as to keep a surface of the resin layer L2 clean. In some embodiments, a material of the film layer L3 may include, for example, polymer (e.g., plastic).

In some embodiments, a material of the resin layer L2 may include a thermoplastic resin (e.g., epoxy resin). In some embodiments, a melting point of the resin layer L2 is lower than 90° C., for example, the melting point of the resin layer L2 is 70° C., 80° C., 90° C., or any value in the foregoing range.

Next, the resin film M0 is transported to the film layer separation assembly 220 along a specific path using the resin film sending element 210. The film layer separation assembly 220 is configured to separate the film layer L3 and the resin layer L2 of the resin film M0 through a specific separation angle A, so as to obtain a resin composite structure M1, in which the resin composite structure M1 includes the release film L1 and the resin layer L2 on the release film L1.

In some embodiments, the film layer separation assembly 220 includes the first roller 222, the film layer receiving element 224, and a second roller 226. The first roller 222 is disposed beneath the resin film sending element 210, and is configured to receive the resin film M0. The film layer receiving element 224 is disposed over the first roller 222, and is configured to receive the separated film layer L3 from the first roller 222 (e.g., wind the film layer L3). The second roller 226 is disposed between the film layer receiving element 224 and the first roller 222 in the Z-axis direction, and is configured to separate the resin layer L2 and the release film L1 (i.e., the resin composite structure M1) from the resin film M0 through the separation angle A (greater than 0° between a direction of the first roller 222 facing the film layer receiving element 224 and a direction of the first roller 222 facing the second roller 226.

In some embodiments, a position of the second roller 226 is adjustable, and the separation angle A is able to be changed by changing the position of the second roller 226. For example, the second roller 226 is moved along the X-axis direction or the Z-axis direction based on a tack of the resin layer L2 to change the separation angle A, so as to achieve a better separation effect of the film layer L3.

Figure 3:
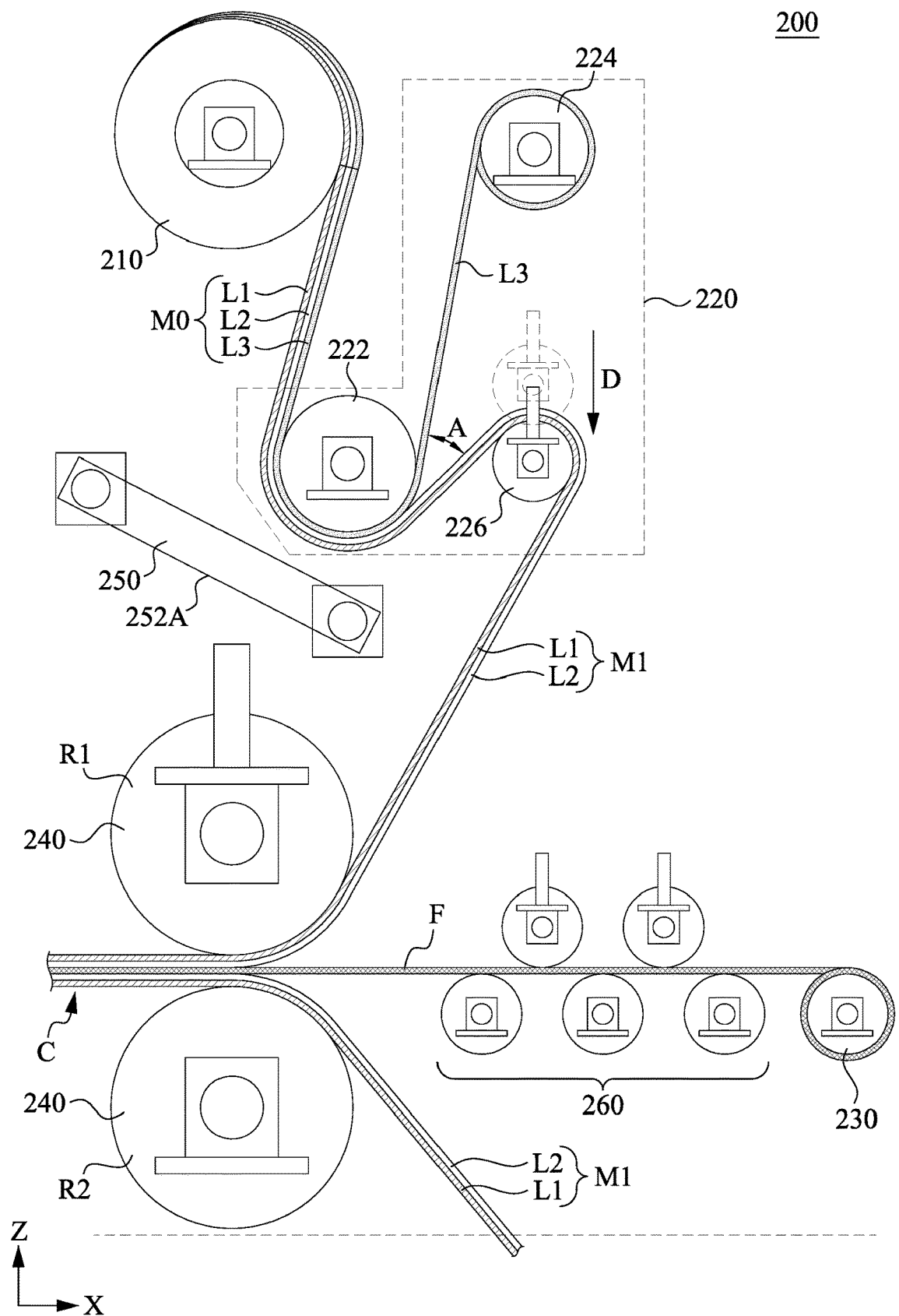
FIG. 3 is a side view illustrating an impregnation device for a fiber prepreg when an impregnation method is performed according to some embodiments of the present disclosure.

For example, please refer to FIG. 3. FIG. 3 is also a side view illustrating an impregnation device 200 for a fiber prepreg when an impregnation method is performed according to some embodiments of the present disclosure. The difference of FIG. 3 from FIG. 2 is that the resin layer L2 shown in FIG. 3 has a relatively high tack. In order to facilitate the separation of the resin layer L2 and the film layer L3, the position of the second roller 226 is moved downward along a direction D (the Z-axis direction) to increase the separation angle A.

In some embodiments, when the tack of the resin layer L2 is lower than or equal to 500 grams, the separation angle between the film layer L3 and the resin layer L2 can be adjusted to be lower than or equal to 18°. For example, when the tack of the resin layer L2 is from 100 grams to 500 grams, the separation angle between the film layer L3 and the resin layer L2 is adjusted to be from 13° to 18° (e.g., 13°, 14°, 15°, 16°, 17°, 18°, or any value in the foregoing range).

In some embodiments, if the tack of the resin layer L2 is from 500 grams to 2,000 grams, the separation angle between the film layer L3 and the resin layer L2 is adjusted to be from 18° to 45°.

For example, if the tack of the resin layer L2 is from 500 grams to 900 grams, the separation angle between the film layer L3 and the resin layer L2 is adjusted to be from 18° to 25° (e.g., 18°, 19°, 20°, 21°, 22°, 23°, 24°, 25°, or any value in the foregoing range). If the tack of the resin layer L2 is from 900 grams to 1,300 grams, the separation angle between the film layer L3 and the resin layer L2 is adjusted to be from 25° to 33° (e.g., 25°, 26°, 27°, 28°, 29°, 30°, 31°, 32°, 33°, or any value in the foregoing range). If the tack of the resin layer L2 is between 1,300 grams to 2,000 grams, the separation angle between the film layer L3 and the resin layer L2 is adjusted to be from 33° to 45° (e.g., 33°, 34°, 35°, 36°, 37°, 38°, 39°, 40°, 41°, 42°, 43°, 44°, 45°, or any value in the foregoing range). When the tack of the resin layer L2 is greater than or equal to 2,000 grams, the separation angle between the film layer L3 and the resin layer L2 is 45°.

It should be noted that, in the case where the separation angle A is not adjusted according to the tack of the resin layer L2, if the tack of the resin layer L2 is too high, the separation effect may be poor, and the resin of the resin layer L2 remains on a surface of the film layer L3; if the tack of the resin layer L2 is too low, the film layer L3 is separated from the resin film M0 too early since a separation stress provided by the separation angle A is too large, which may cause the film layer L3 to be displaced and difficult to be effectively received, and also increases an exposure time of the resin layer L2 and indirectly increases the risk of contaminant molecules attaching to the surface of the resin.

Please refer back to FIG. 2, on the other hand, a fiber layer F is provided to the hot pressing element 240 simultaneously using the fiber sending element 230. In some embodiments, the fiber layer F is, for example, carbon fibers or glass fibers, or the like. In some embodiments, a yarn spreading element 260 is disposed between the fiber sending element 230 and the hot pressing element 240, and is configured to spread the fiber layer F and adjust fiber arrangement and/or width and other properties of the fiber layer F.

Next, the fiber layer F is received using the hot pressing element 240, and two resin composite structure M1 are received simultaneously from upper and lower sides (in terms of the Z-axis direction) of the fiber layer F (e.g., the fiber layer F is acted as a symmetrical axis, and the element at the lower side and the element at the upper side are distributed symmetrically (not shown)).

Next, the resin layers L2 of the two resin composite structures M1 are in direct contact with the fiber layer L at a temperature higher than 90° C. (e.g., 90° C., 100° C., 110° C., 120° C., or any value in the foregoing range), and those with an order of the resin composite structure M1, the fiber layer F and the resin composite structure M1 from top to bottom are hot-pressed to obtain a fiber prepreg C, in which both an upper surface and a lower surface of the fiber layer F of the fiber prepreg C are in direct contact with the resin layer L2.

It is worth emphasizing that the impregnation device 200 is a continuous device. While the fiber layer F and the resin composite structures M1 are hot-pressed using the hot pressing element 240, the film layer L3 and the resin layer L2 of the resin film M0 are separated using the film layer separation assembly 220 simultaneously. Therefore, if there is no thermal barrier element 250 disposed between the hot pressing element 240 and the film layer separation assembly 220 for blocking heat from the hot pressing element 240, the resin may be softened by heat and stick to the film layer L3 during separation when the film layer separation assembly 220 separates the resin film M0, causing the resin layer L2 for subsequent hot pressing to be damaged, reducing an impregnation effect of the fiber prepreg C, even if the hot pressing is performed at a temperature lower than 90° C. (e.g., 70° C. to 85° C.) using the hot pressing element 240.

In some embodiments, the thermal barrier element 250 is an insulating material, such as a porous material (e.g., foam or fibers) or a heat reflective material (aluminum foil or nickel, etc.).

In some embodiments, the thermal barrier element 250 can completely shield the hot pressing element 240, for example, when projected vertically on a horizontal plane where the hot pressing element 240 is located (the plane on the X axis that is perpendicular to the Z axis), a projection of the thermal barrier element 250 is coincident and larger than a projection of the hot pressing element 240. The hot pressing element 240 is shielded by a large area to prevent hot air from flowing to the film layer separation assembly 220 and the resin film sending element 210, so as to achieve a better heat blocking effect.

In some embodiments, a surface 252A of the thermal barrier element 250 close to the hot pressing element 240 may be made of a heat reflective material (e.g., metal (aluminum foil or nickel, etc.)), or a shape of the thermal barrier element 250 is adjusted to enhance a heat blocking effect.

For example, see FIG. 4A-4D, those illustrate different examples of the thermal barrier elements 250 in some embodiments of the present disclosure.

Figure 4A:
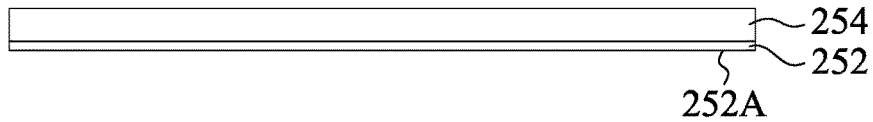
FIGS. 4A-4D illustrate different examples of thermal barrier elements in some embodiments of the present disclosure.
Figure 4B:
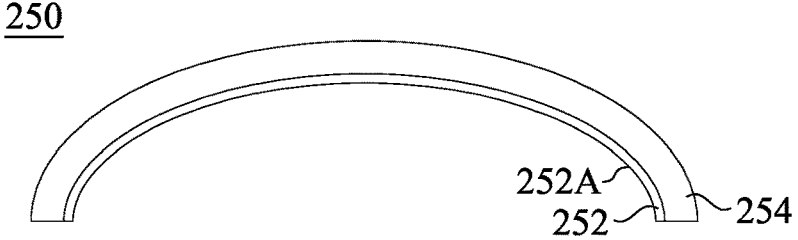

The thermal barrier elements 250 in FIGS. 4A and 4B (please refer to FIG. 2 simultaneously) are double-layered structures. One side close to the hot pressing element 240 is a heat reflective layer 252, and another side is a porous layer 254. The difference between FIG. 4A and FIG. 4B is that the thermal barrier element 250 in FIG. 4B is arc-shaped, and a concave shape of the arc is designed with the heat reflective layer 252 facing the hot pressing element 240 to converge heat at a side of the hot pressing element 240. Compared with a rectangular plate design in FIG. 4A, the arc shape in FIG. 4B achieves a better heat blocking effect. Even if the hot pressing temperature is raised to 110° C., the resin layer L2 is not soften excessively to remain on the film layer L3.

Figure 4C:
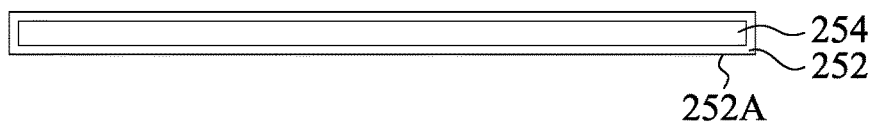
Figure 4D:
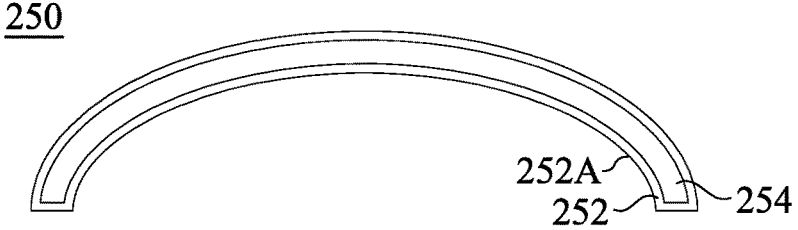

The main difference between the thermal barrier elements 250 of FIGS. 4C and 4D and the thermal barrier elements 250 of FIGS. 4A and 4B is that the thermal barrier element 250 of FIGS. 4C and 4D is a porous layer 254 covered with a heat reflective layer 252. That is, in the thermal barrier element 250 shown in FIGS. 4C and 4D, the heat reflective layer 252 is exposed on an outer surface, which can also achieve a heat blocking effect of reflecting thermal energy. On the other hand, the difference between FIG. 4C and FIG. 4D is that FIG. 4C is a rectangle, while FIG. 4D is an arc. This part of the discussion can be referred to the description of FIG. 4A and FIG. 4B, and will not be repeated here.

Therefore, please refer back to FIG. 2, by adjusting the position, shielding area, shape, material and structural design of the thermal barrier element 250, the heat blocking effect of the thermal barrier element 250 can be regulated, so that an allowable hot pressing temperature of the hot pressing element 240 is increased when the film layer L3 is separated and there is no resin remained on the film layer L3, thereby increasing selection of resin types of the resin layer L2. For example, a resin with a lower melting point (e.g., lower than 90° C.) can be included in the selection of the resin layer L2.

In some embodiments, a thickening process of the fiber layer F may be selectively added according to a requirement of a thickness of the fiber layer F, which includes providing another fiber layer; removing the release film L1 of the fiber prepreg C to obtain a fiber prepreg to be processed; and hot pressing the other fiber layer and the fiber prepreg to be processed in a way that the other fiber layer is in direct contact with the resin layer L2 to obtain a thickened fiber prepreg.

Some embodiments of the present disclosure provides the impregnation device for the fiber prepreg and the impregnation method thereof, which avoids premature softening of the resin film and adhesion to the film layer when the film layer is separated by the film layer separation assembly due to hot air of the hot pressing element, resulting in resin defects and poor fiber impregnation.

Although the present disclosure has been disclosed above in several specific embodiments, various modifications, changes, and substitutions may be made to the foregoing disclosure, and it should be understood that those do not depart from the spirit and scope of the present disclosure, and certain features of embodiments of the present disclosure will be employed without corresponding use of other features. Therefore, the spirit of the present disclosure and the scope of the claims should not be limited to those described in the exemplary embodiments above.

What is claimed is:

1. An impregnation device for a fiber prepreg, comprising:
   a film layer separator, comprising:
      a first roller;
      a film layer receiver disposed over the first roller; and
      a second roller disposed between the film layer receiver and the first roller in a vertical direction, and a separation angle between a direction of the first roller facing the film layer receiver and a direction of the first roller facing the second roller being greater than 0°;
   a resin film provider disposed over the first roller, and when projected vertically on a horizontal plane where the first roller is located, the resin film provider and the film layer receiver being respectively located at opposite sides of the first roller, wherein the horizontal plane where the first roller is located is perpendicular to the vertical direction;
   a fiber provider disposed beneath the film layer separator;
   a hot pressing processor disposed beneath the film layer separator in the vertical direction; and
   a thermal barrier disposed between the film layer separator and the hot pressing processor in the vertical direction, wherein the thermal barrier comprises an insulating material and is arc-shaped, and a concave shape of the thermal barrier only faces the hot pressing processor to converge heat at a side of the hot pressing processor.

2. The impregnation device of claim 1, wherein a position of the second roller is adjustable, and a separation angle is able to be changed by changing the position of the second roller.

3. The impregnation device of claim 1, wherein the insulating material comprises a porous material, a heat reflective material, or a combination thereof.

4. The impregnation device of claim 1, wherein a surface of the thermal barrier close to the hot pressing processor is made of a heat reflective material.

5. The impregnation device of claim 1, wherein when projected vertically on a horizontal plane where the hot pressing processor is located, a projection of the thermal barrier is coincident and larger than a projection of the hot pressing processor, wherein the horizontal plane where the hot pressing processor is located is perpendicular to the vertical direction.

* * * * *